US012601464B1

(12) United States Patent
Chen et al.

(10) Patent No.: US 12,601,464 B1
(45) Date of Patent: Apr. 14, 2026

(54) HOUSING STRUCTURE WITH LIGHT EMITTING DESIGN

(71) Applicant: Acer Incorporated, New Taipei City (TW)

(72) Inventors: Hung-Chi Chen, New Taipei City (TW); Huei-Ting Chuang, New Taipei City (TW); Shun-Bin Chen, New Taipei City (TW); Meng-Chuan Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 19/177,643

(22) Filed: Apr. 14, 2025

(30) Foreign Application Priority Data

Dec. 3, 2024 (CN) ......................... 202411764327.6

(51) Int. Cl.
*F21V 15/01* (2006.01)

(52) U.S. Cl.
CPC ........ *F21V 15/013* (2013.01); *F21V 2200/20* (2015.01)

(58) Field of Classification Search
CPC ..... F21V 15/013; F21V 2200/20; G09F 13/18
USPC ....... 362/602, 603, 604, 605, 606, 607, 617, 362/619, 632, 633, 634, 812; 40/546, 40/579, 580
See application file for complete search history.

(56) References Cited

U.S. PATENT DOCUMENTS 6,325,530 B1 * 12/2001 Bernazzani ............. G09F 19/12 362/555
6,416,844 B1 * 7/2002 Robson ..................... B44C 5/04 428/161
6,422,711 B1 * 7/2002 Chao ......................... G09F 9/33 362/23.11
7,066,633 B2 * 6/2006 Ng ...................... G09F 13/0404 362/559
2013/0222736 A1 * 8/2013 Qi ......................... G06F 1/1637 362/602

FOREIGN PATENT DOCUMENTS

CN 103293764 9/2013
CN 109383410 2/2019
CN 109493754 3/2019
CN 210574877 5/2020
EP 3576170 12/2019

* cited by examiner

*Primary Examiner* — Thomas M Sember
(74) *Attorney, Agent, or Firm* — JCIPRNET

(57) ABSTRACT

A housing structure, including a housing member, a light transmitting adhesive layer, and a light emitting module, is provided. The housing member has an appearance surface, an inner surface opposite to the appearance surface, and a light transmitting slot penetrating the appearance surface and the inner surface. The light transmitting adhesive layer is filled in the light transmitting slot. The light emitting module is disposed on the inner surface and covers the light transmitting slot or is located on one side of the light transmitting slot to transmit light to the light transmitting adhesive layer.

15 Claims, 7 Drawing Sheets

HOUSING STRUCTURE WITH LIGHT EMITTING DESIGN

CROSS-REFERENCE TO RELATED APPLICATION

This application claims the priority benefit of China application serial no. 202411764327.6, filed on Dec. 3, 2024. The entirety of the above-mentioned patent application is hereby incorporated by reference herein and made a part of this specification.

BACKGROUND

Technical Field

The disclosure relates to a housing structure, and in particular to a housing structure with a light emitting design.

Description of Related Art

To enhance brand recognition and improve visual aesthetics, some notebook computers adopt light emitting logos on back covers of displays. The specific design method is to open a light transmitting slot on the back cover according to the outline of the light emitting logo, and install a light emitting module on one side of the light transmitting slot. The light emitting module generally includes a light source, a light guide plate, and a diffusion plate. The diffusion plate is disposed on the light guide plate and is attached to one side of the light transmitting slot. Generally speaking, the diffusion plate is provided with a convex portion matching the outline of the light emitting logo to be embedded in the light transmitting slot. However, due to manufacturing tolerances, the diffusion plate may be inefficiently installed or even impossible to be installed. In addition, the thickness superposition of the diffusion plate and the light guide plate does not meet the design requirement of product thinning.

SUMMARY

The disclosure provides a housing structure whose design helps to improve manufacturing efficiency and meets the design requirement of product thinning.

According to an embodiment of the disclosure, a housing structure includes a housing member, a light transmitting adhesive layer, and a light emitting module. The housing member has an appearance surface, an inner surface opposite to the appearance surface, and a light transmitting slot penetrating the appearance surface and the inner surface. The light transmitting adhesive layer is filled in the light transmitting slot. The light emitting module is disposed on the inner surface and includes a light source and a light guide plate. The light source transmits light to the light guide plate, and the light guide plate covers the light transmitting slot.

According to another embodiment of the disclosure, a housing structure includes a housing member, a light transmitting adhesive layer, and a light emitting module. The housing member has an appearance surface, an inner surface opposite to the appearance surface, and a light transmitting slot penetrating the appearance surface and the inner surface. The light transmitting adhesive layer is filled in the light transmitting slot. The light emitting module is disposed on the inner surface and is located on one side of the light transmitting slot. The light emitting module includes a light source, and the light source transmits light to the light transmitting adhesive layer.

Based on the above, through filling a light transmitting adhesive in the light transmitting slot and curing to form the light transmitting adhesive layer to serve as a light guide structure, a light homogenizing structure, or a combination thereof, not only can the manufacturing efficiency of the housing structure be improved, but the design requirement of product thinning can also be met.

DESCRIPTION OF THE EMBODIMENTS

Figure 1A:
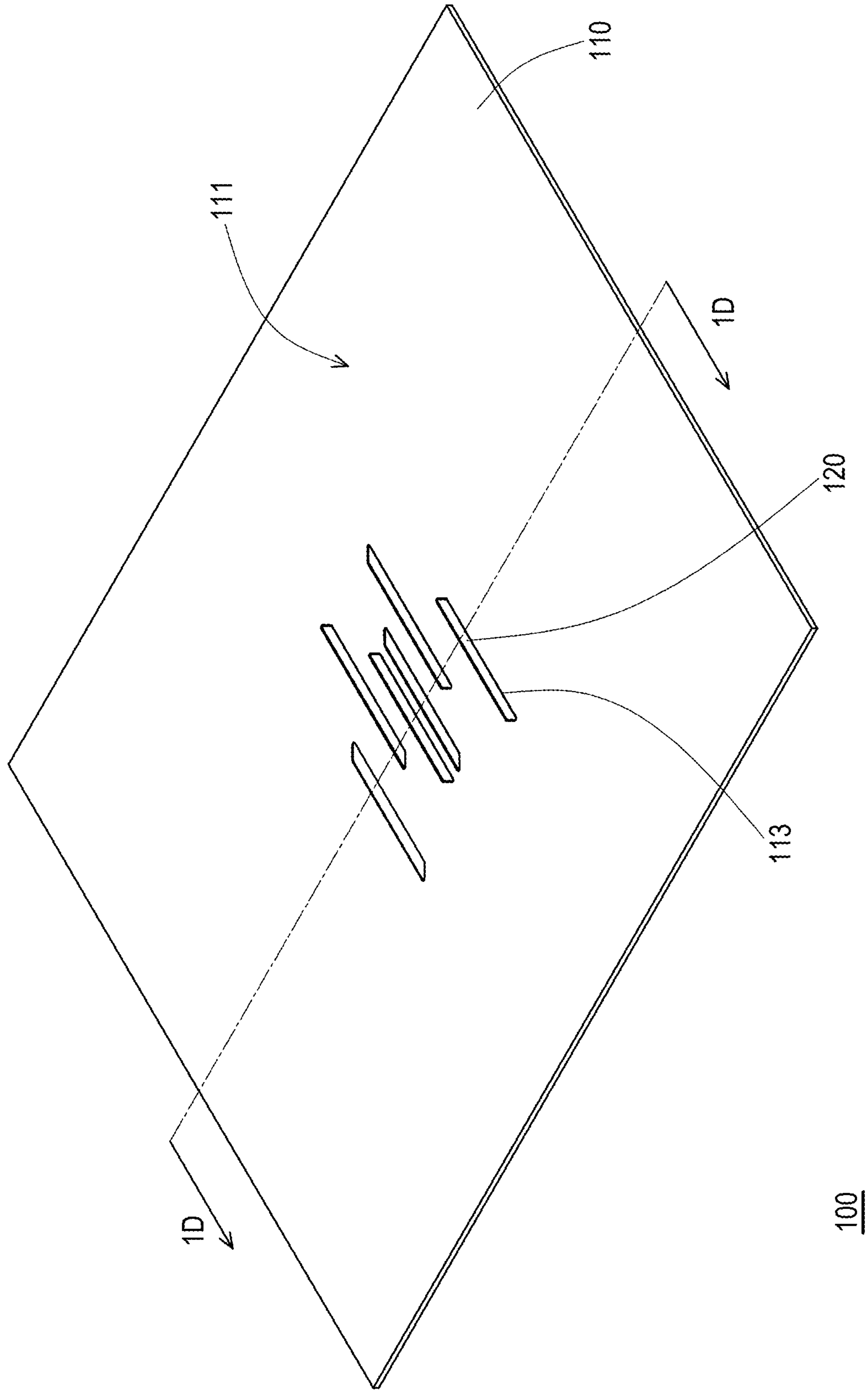
FIG. 1A and FIG. 1B are schematic diagrams of a housing structure according to an embodiment of the disclosure at two different viewing angles.

Reference will now be made in detail to the exemplary embodiments of the disclosure, and examples of the exemplary embodiments are illustrated in the drawings. Wherever possible, the same reference numerals are used in the drawings and the description to refer to the same or similar parts.

Figure 1B:
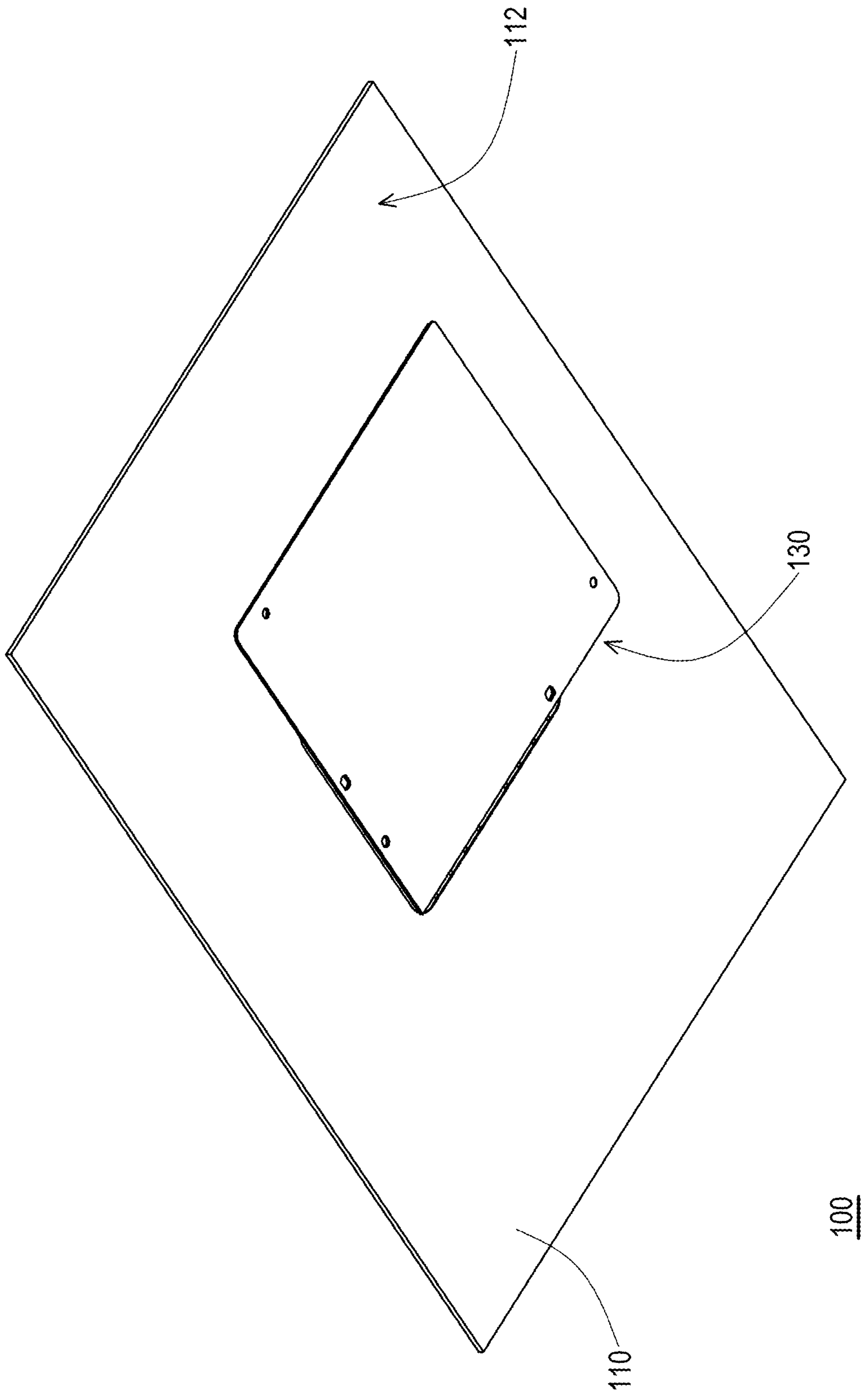
Figure 1C:
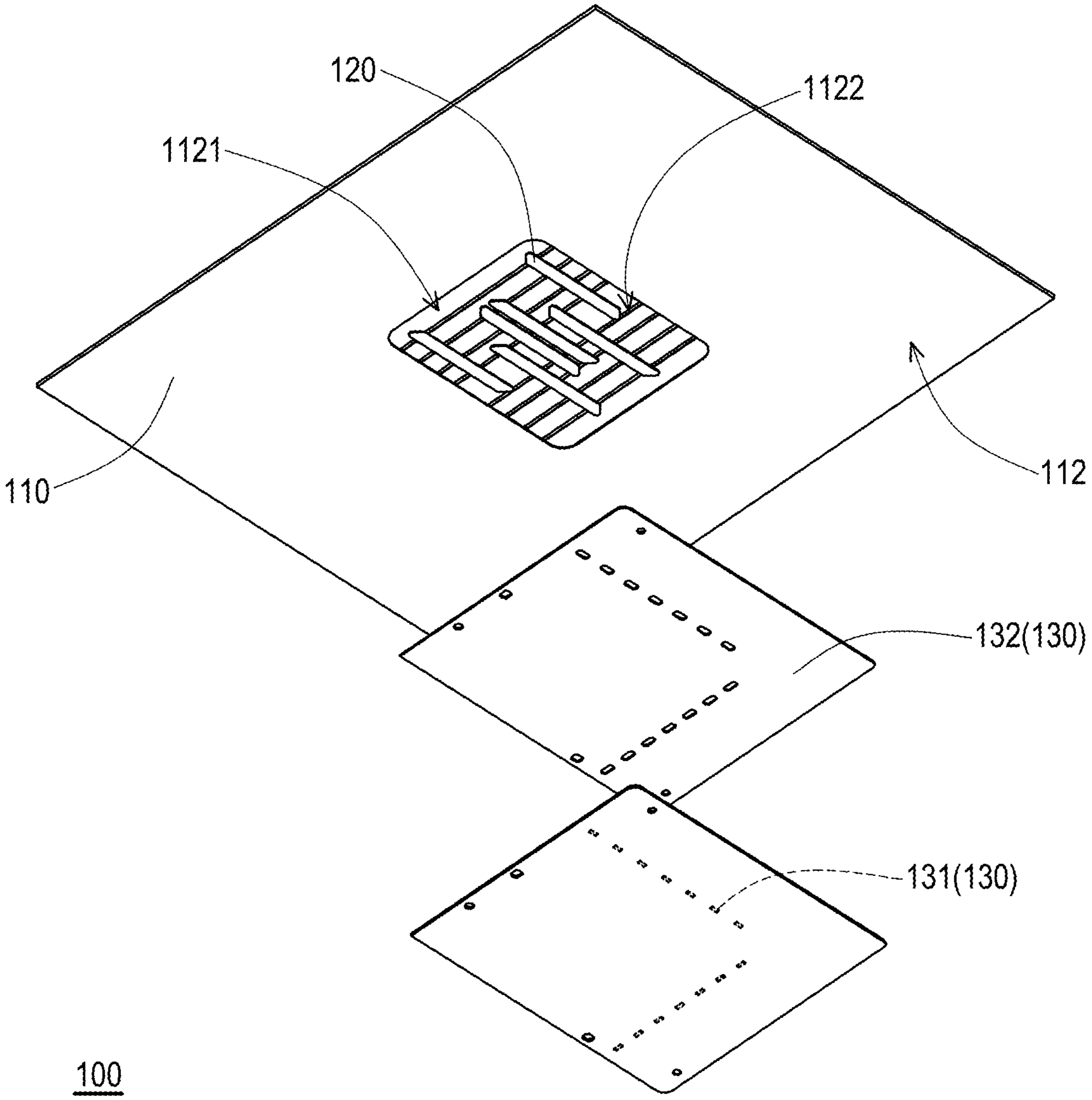
FIG. 1C is an exploded schematic diagram of the housing structure of FIG. 1B.
Figure 1D:
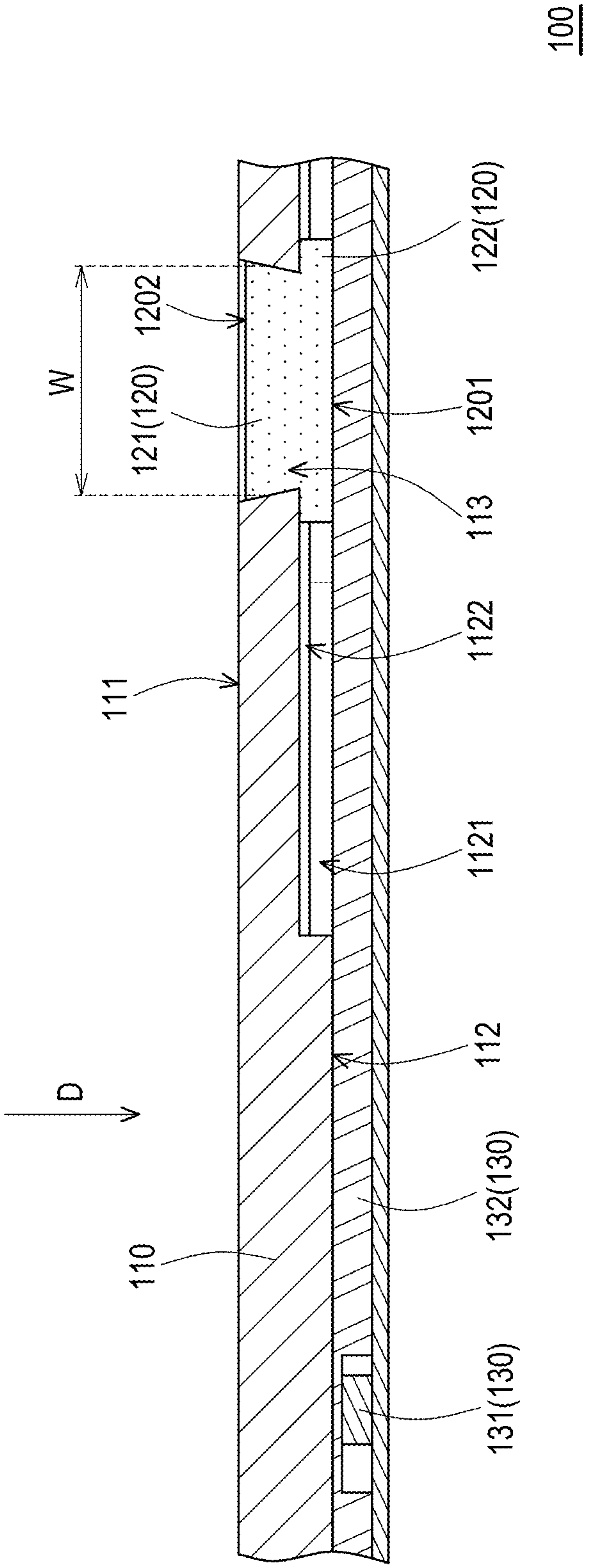
FIG. 1D is a partial cross-sectional enlarged schematic diagram along a line segment 1D-1D of FIG. 1A.

FIG. 1A and FIG. 1B are schematic diagrams of a housing structure according to an embodiment of the disclosure at two different viewing angles. FIG. 1C is an exploded schematic diagram of the housing structure of FIG. 1B. FIG. 1D is a partial cross-sectional enlarged schematic diagram along a line segment 1D-1D of FIG. 1A. First, please refer to FIG. 1A and FIG. 1B. In the embodiment, a housing structure 100 may be a part of a notebook computer, a tablet computer, a smart phone, or other electronic devices and has a light emitting design, such as a light emitting logo, to enhance brand recognition and improve visual aesthetics.

Please refer to FIG. 1A to FIG. 1D. The housing structure 100 includes a housing member 110, a light transmitting adhesive layer 120, and a light emitting module 130. The housing member 110 has an appearance surface 111, an inner surface 112 opposite to the appearance surface 111, and a light transmitting slot 113 penetrating the appearance surface 111 and the inner surface 112, wherein the light transmitting adhesive layer 120 is filled in the light transmitting slot 113, and the light emitting module 130 is disposed on the inner surface 112 corresponding to the light transmitting slot 113 and the light transmitting adhesive layer 120 filled therein.

The light transmitting adhesive layer 120 may be formed by curing a light curable or heat curable adhesive. The specific manufacturing procedure is to first attach a removable film to the appearance surface 111 such that the film covers the light transmitting slot 113, then inject the light curable or heat curable adhesive into the light transmitting slot 113 from the side where the inner surface 112 is located through a dispensing machine or other appropriate equipment, then press the light curable or heat curable adhesive from the side where the inner surface 112 is located through a pressing head or other appropriate equipment, finally remove the film, and perform a light curing or heat curing procedure on the light curable or heat curable adhesive to form the light transmitting adhesive layer 120.

In an example, the main component of the light curable adhesive may be acrylate, and the compound may include polyurethane and epoxy. The content of polyurethane accounts for 1 to 2% of the total amount of the adhesive, and the content of epoxy accounts for 0.5% of the total amount of the adhesive. In another example, the main component of the light curable adhesive may be acrylate, and the compound may include polyurethane, epoxy, and propylene oxide. The content of polyurethane accounts for 1 to 2% of the total amount of the adhesive, the content of epoxy accounts for 0.5% of the total amount of the adhesive, and the content of propylene oxide accounts for 0.2 to 0.4% of the total amount of the adhesive. In yet another example, the main component of the light curable adhesive may be acrylate, and the compound may include polyurethane, epoxy, propylene oxide, and isopropyl alcohol. The content of polyurethane accounts for 1 to 2% of the total amount of the adhesive, the content of epoxy accounts for 1 to 2% of the total amount of the adhesive, the content of propylene oxide accounts for 0.1 to 0.3% of the total amount of the adhesive, and the content of isopropyl alcohol accounts for 0.1 to 0.3% of the total amount of the adhesive.

Please refer to FIG. 1B to FIG. 1D. The light emitting module 130 is disposed on the inner surface 112 and includes a light source 131 and a light guide plate 132. The light source 131 transmits light to the light guide plate 132, and the light guide plate 132 covers the light transmitting slot 113 to further transmit the light to the light transmitting adhesive layer 120 filled in the light transmitting slot 113, and the light is then transmitted to the outside by the light transmitting adhesive layer 120. Since the light transmitting adhesive layer 120 may serve as a light guide structure, a light homogenizing structure, or a combination thereof, the light transmitting adhesive layer 120 may not only transmit the light from the light guide plate 132 to the outside, but also present a light emitting logo with uniform brightness on the appearance surface 111 of the housing member 110. In addition, since the light transmitting adhesive layer 120 is formed by filling the light transmitting adhesive in the light transmitting slot 113 and then curing, not only can the manufacturing efficiency of the housing structure 100 be improved, but the design requirement of product thinning can also be met.

In the embodiment, the light transmitting adhesive layer 120 contacts the light guide plate 132, and the light transmitting adhesive layer 120 has a light incident surface 1201 located on the side where the inner surface 112 is located and a light emergent surface 1202 exposed on the side where the appearance surface 111 is located. In detail, the light incident surface 1201 contacts the light guide plate 132, and the light emergent surface 1202 may be lower than or flush with the appearance surface 111. On the other hand, the cross-sectional outline of the light transmitting slot 113 may be a trapezoidal outline, and the cross-sectional width of the light transmitting slot 113 on the appearance surface 111 is greater than the cross-sectional width of the light transmitting slot 113 on the inner surface 112. Specifically, a cross-sectional width W of the light transmitting slot 113 gradually decreases in a direction D from the appearance surface 111 toward the inner surface 112. Such a cross-sectional outline design may prevent an uncured light curable or heat curable adhesive from flowing back to the side where the inner surface 112 is located from the light transmitting slot 113.

Please refer to FIG. 1B to FIG. 1D. The light transmitting adhesive layer 120 includes a first portion 121 located inside the light transmitting slot 113 and a second portion 122 located outside the light transmitting slot 113. In detail, the first portion 121 of the light transmitting adhesive layer 120 matches the cross-sectional outline of the light transmitting slot 113 and has a trapezoidal cross-sectional outline. In addition, the second portion 122 protrudes from the side where the inner surface 112 is located and contacts the light guide plate 132. In other words, the light incident surface 1201 is located at the second portion 122, and the light emergent surface 1202 is located at the first portion 121.

Furthermore, the housing member 110 further has a first recess 1121 located on the inner surface 112 and communicated with the light transmitting slot 113, wherein the second portion 122 of the light transmitting adhesive layer 120 is distributed in the first recess 1121, and the light guide plate 132 covers the first recess 1121 to contact the second portion 122. On the other hand, the housing member 110 further has a second recess 1122 located in the first recess 1121 and communicated with the light transmitting slot 113, and the second portion 122 of the light transmitting adhesive layer 120 is distributed in the second recess 1122.

For example, the second recess 1122 may include multiple linear recesses located inside the first recess 1121 and intersect, for example, perpendicularly intersect, with the light transmitting slot 113. During the process of pressing the uncured light curable or heat curable adhesive from the side where the inner surface 112 is located through the pressing head or other appropriate equipment, the light curable or heat curable adhesive may further overflow to the second recess 1122 or gas in the light curable or heat curable adhesive may be discharged outward through the second recess 1122 to improve the density and the uniformity of the light transmitting adhesive layer 120 that is subsequently cured and formed, and prevent bubbles or pores from being generated in the light transmitting adhesive layer 120 that is subsequently cured and formed.

Figure 2A:
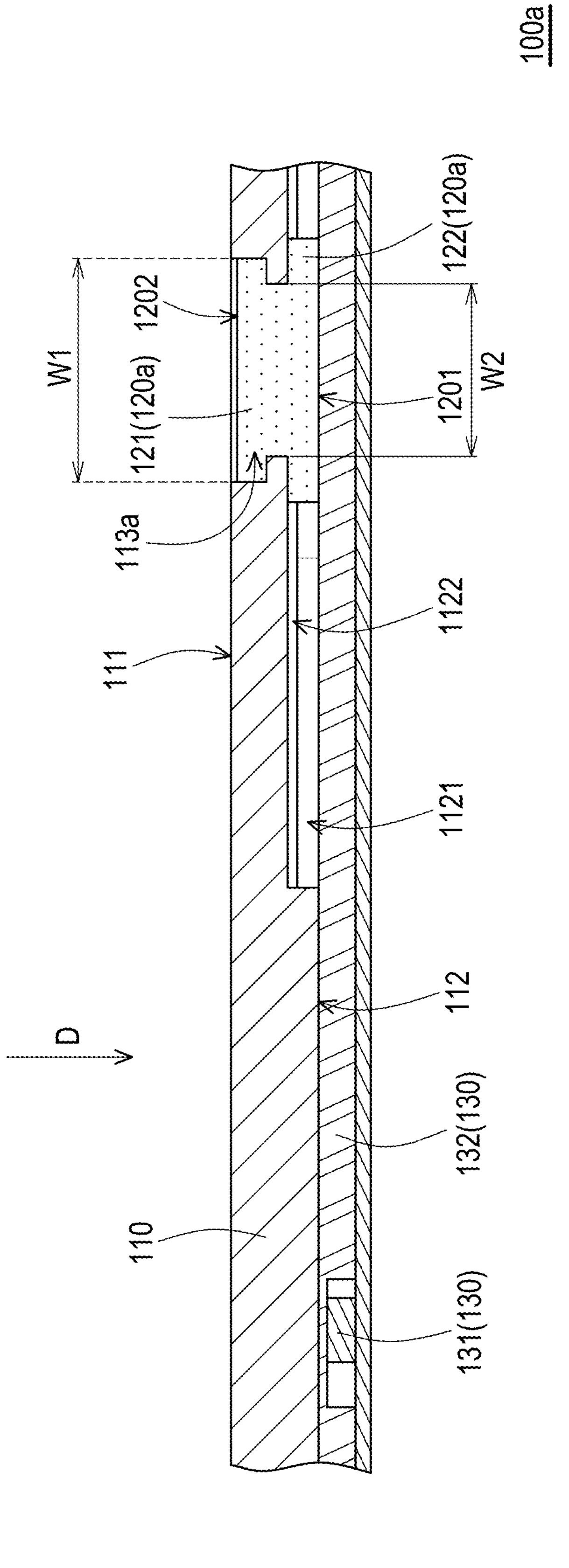
FIG. 2A to FIG. 2C are partial cross-sectional enlarged schematic diagrams of a housing structure according to other embodiments of the disclosure.
Figure 2B:
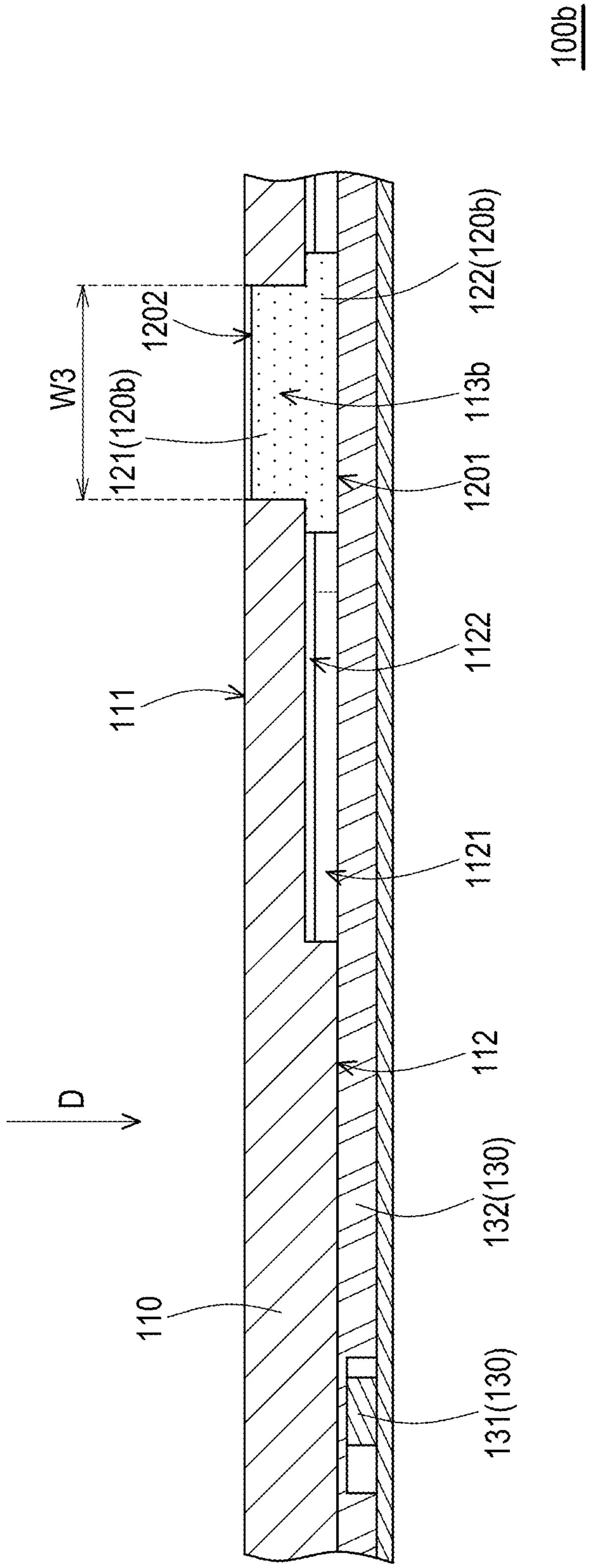
Figure 2C:
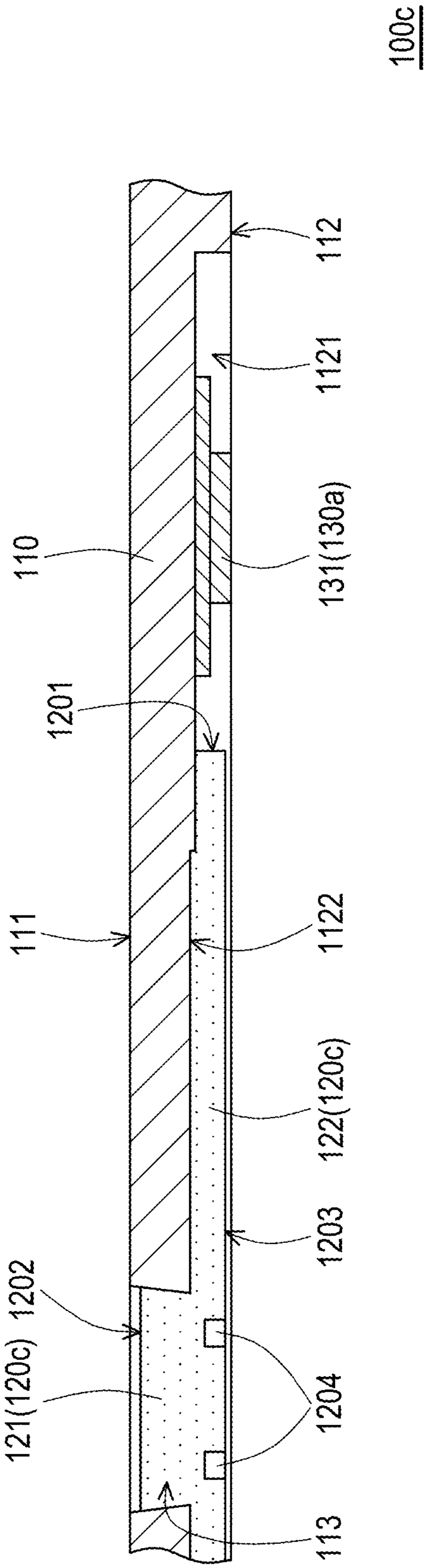

FIG. 2A to FIG. 2C are partial cross-sectional enlarged schematic diagrams of a housing structure according to other embodiments of the disclosure. Please refer to FIG. 2A. The structural designs of a housing structure 100*a* and the housing structure 100 shown in FIG. 1D are substantially the same, and the main difference lies in the cross-sectional outline design of the light transmitting slot. Specifically, in the embodiment, the cross-sectional outline of a light transmitting slot 113*a* may be a stepped outline, and a cross-sectional width W1 of the light transmitting slot 113*a* on the appearance surface 111 is greater than a cross-sectional width W2 of the light transmitting slot 113*a* on the inner surface 112. Such a cross-sectional outline design may prevent the uncured light curable or heat curable adhesive from flowing back to the side where the inner surface 112 is located from the light transmitting slot 113*a*. In addition, the first portion 121 of a light transmitting adhesive layer 120*a* matches the cross-sectional outline of the light transmitting slot 113*a* and has a stepped cross-sectional outline.

Please refer to FIG. 2B. The structural designs of a housing structure 100*b* and the housing structure 100 shown in FIG. 1D are substantially the same, and the main difference lies in the cross-sectional outline design of the light transmitting slot. Specifically, in the embodiment, the cross-sectional outline of a light transmitting slot 113*b* may be a rectangular outline, and a cross-sectional width W3 of the light transmitting slot 113*b* remains unchanged in the direction D from the appearance surface 111 toward the inner surface 112. In addition, the first portion 121 of a light transmitting adhesive layer 120*b* matches the cross-sectional outline of the light transmitting slot 113*b* and has a rectangular cross-sectional outline.

Please refer to FIG. 2C. The structural designs of a housing structure 100*c* and the housing structure 100 shown in FIG. 1D are similar, and the main design difference in the housing structure 100*c* is described in detail below. In the housing structure 100*c* of the embodiment, a light emitting module 130*a* is not provided with a light guide plate, and the light source 131 is disposed in the first recess 1121. Specifically, the light source 131 is located on one side of the light transmitting slot 113 and is distributed in an edge region of the second portion 122 of a light transmitting adhesive layer 120*c*.

On the other hand, the light incident surface 1201 of the light transmitting adhesive layer 120*c* faces the light source 131, and the light emergent surface 1202 exposed on the appearance surface 111 is substantially perpendicular to the light incident surface 1201. Furthermore, the light transmitting adhesive layer 120*c* further has a bottom surface 1203 located at the second portion 122 and opposite to the light emergent surface 1202, wherein the light incident surface 1201 is connected (for example, vertically connected) to the bottom surface 1203, and the bottom surface 1203 is provided with an optical microstructure 1204. For example, the optical microstructure 1204 may be a convex dot, a concave dot, a convex pattern, a concave pattern, or an optical microstructure with other appropriate shapes and may be formed by transfer printing when the light curable or heat curable adhesive is pressed through the pressing head or other appropriate equipment. In addition, the distribution range of the optical microstructure 1204 in the second portion 122 at least falls within a region where the second portion 122 and the light transmitting slot 113 are located opposite to each other or at least falls within a projection region of the first portion 121 on the second portion 122.

Through configuring the optical microstructure 1204 in the second portion 122 of the light transmitting adhesive layer 120*c*, the second portion 122 of the light transmitting adhesive layer 120*c* may serve as a light guide structure. When light from the light source 131 enters the second portion 122 of the light transmitting adhesive layer 120*c* from the light incident surface 1201, the light may be transmitted inside the second portion 122 using the principle of total reflection, the total reflection of the light is then destroyed using the optical microstructure 1204, and the light is guided to the first portion 121 and finally uniformly emitted outward from the light emergent surface 1202. In the case where the light guide plate is not required, the overall thickness of the product may be further reduced.

In summary, through filling the light transmitting adhesive in the light transmitting slot and curing to form the light transmitting adhesive layer to serve as the light guide structure, the light homogenizing structure, or a combination thereof, not only can the manufacturing efficiency of the housing structure be improved, but the design requirement of product thinning can also be met. In addition, since the light transmitting adhesive layer may serve as the light guide structure, the light homogenizing structure, or a combination thereof, the light transmitting adhesive layer may not only transmit the light from the light emitting module to the outside, but also present the light emitting logo with uniform brightness on the appearance surface of the housing member.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A housing structure, comprising:

a housing member, having an appearance surface, an inner surface opposite to the appearance surface, and a light transmitting slot penetrating the appearance surface and the inner surface;

a light transmitting adhesive layer, filled in the light transmitting slot, wherein the light transmitting adhesive layer comprises a first portion located inside the light transmitting slot and a second portion located outside the light transmitting slot; and a light emitting module, disposed on the inner surface and comprising a light source and a light guide plate, wherein the second portion protrudes from a side where the inner surface is located and contacts the light guide plate, wherein the light source transmits light to the light guide plate, and the light guide plate covers the light transmitting slot.

2. The housing structure according to claim 1, wherein the light transmitting adhesive layer has a light incident surface contacting the light guide plate and a light emergent surface opposite to the light incident surface, and the light emergent surface is lower than or flush with the appearance surface.

3. The housing structure according to claim 1, wherein a cross-sectional outline of the light transmitting slot comprises a stepped outline, a trapezoidal outline, or a rectangular outline.

4. The housing structure according to claim 1, wherein a cross-sectional width of the light transmitting slot on the appearance surface is greater than a cross-sectional width of the light transmitting slot on the inner surface.

5. The housing structure according to claim 1, wherein a cross-sectional width of the light transmitting slot gradually decreases in a direction from the appearance surface toward the inner surface.

6. The housing structure according to claim 1, wherein a cross-sectional width of the light transmitting slot remains unchanged in a direction from the appearance surface toward the inner surface.

7. The housing structure according to claim 1, wherein the housing member further has a first recess located on the inner surface and communicated with the light transmitting slot, and the second portion is distributed in the first recess and contacts the light guide plate.

8. The housing structure according to claim 7, wherein the housing member further has a second recess located in the first recess and communicated with the light transmitting slot, and the second portion of the light transmitting adhesive layer is distributed in the second recess.

9. The housing structure according to claim 8, wherein the second recess intersects with the light transmitting slot.

10. A housing structure, comprising:

a housing member, having an appearance surface, an inner surface opposite to the appearance surface, and a light transmitting slot penetrating the appearance surface and the inner surface;

a light transmitting adhesive layer, filled in the light transmitting slot, wherein the light transmitting adhesive layer comprises a first portion located inside the light transmitting slot and a second portion located outside the light transmitting slot and protruding from a side where the inner surface is located; and a light emitting module, disposed on the inner surface and located on one side of the light transmitting slot, wherein the light emitting module comprises a light source distributed in an edge region of the second portion, and the light source transmits light to the light transmitting adhesive layer.

11. The housing structure according to claim 10, wherein the light transmitting adhesive layer has a light incident surface located at the second portion and a light emergent surface located at the first portion, wherein the light incident surface faces the light source, and the light emergent surface is lower than or flush with the appearance surface.

12. The housing structure according to claim 11, wherein the light transmitting adhesive layer further has a bottom surface located at the second portion and opposite to the light emergent surface, wherein the light incident surface is connected to the bottom surface, and the bottom surface is provided with an optical microstructure.

13. The housing structure according to claim 10, wherein the housing member further has a first recess located on the inner surface and communicated with the light transmitting slot, and the second portion is distributed in the first recess.

14. The housing structure according to claim 13, wherein the housing member further has a second recess located in the first recess and communicated with the light transmitting slot, and the second portion of the light transmitting adhesive layer is distributed in the second recess.

15. The housing structure according to claim 13, wherein the light source is disposed in the first recess.

* * * * *